United States Patent [19]
Wuest et al.

[11] Patent Number: 5,416,376
[45] Date of Patent: May 16, 1995

[54] AEROGEL-SUPPORTED FILAMENT

[75] Inventors: Craig R. Wuest, Danville; Thomas M. Tillotson, Tracy, both of Calif.; Coleman V. Johnson, III, Dallas, Tex.

[73] Assignee: The Regents of the University of California

[21] Appl. No.: 969,084

[22] Filed: Oct. 29, 1992

[51] Int. Cl.⁶ .......................... H01J 1/88; H01J 19/42; H01J 47/00
[52] U.S. Cl. .................... 313/93; 250/385.1; 313/243; 313/271; 313/279; 313/315; 313/345
[58] Field of Search .................. 313/93, 243, 247, 268, 313/269, 271, 275, 279, 345, 315, 316; 256/374, 385.1; 445/32

[56] References Cited

U.S. PATENT DOCUMENTS

| | | |
|---|---|---|
| 2,499,830 | 3/1950 | Molloy . |
| 2,679,609 | 5/1954 | Meloy . |
| 3,486,065 | 12/1969 | Martin .................................. 313/279 |
| 3,784,860 | 1/1974 | Cocks et al. . |
| 4,289,967 | 9/1981 | Hanson et al. . |
| 4,543,483 | 9/1985 | Genrich . |
| 4,715,917 | 12/1987 | Tirelli et al. . |
| 4,733,085 | 3/1988 | Anderson . |
| 5,003,177 | 3/1991 | Hornstra . |
| 5,019,711 | 5/1991 | Antonuk . |

FOREIGN PATENT DOCUMENTS 0232498  10/1959  Australia .............................. 313/93

OTHER PUBLICATIONS

Ables et al., *Muon Drift Chamber Physics and Engineering R&D Activities for the L\* and GEM Detectors in FY1991*, released for publication Oct. 30, 1991 by Lawrence Livermore National Laboratory, UCRL ID 108489.

Primary Examiner—Donald J. Yusko
Assistant Examiner—N. D. Patel
Attorney, Agent, or Firm—Daryl S. Grzybicki; Henry P. Sartorio

[57] ABSTRACT

The present invention is a thin filament embedded in a low density aerogel for use in radiation detection instruments and incandescent lamps. The aerogel provides a supportive matrix that is thermally and electrically non-conductive, mechanically strong, highly porous, gas-permeable, and transparent to ionizing radiation over short distances. A low density, open-cell aerogel is cast around a fine filament or wire, which allows the wire to be positioned with little or no tension and keeps the wire in place in the event of breakage. The aerogel support reduces the stresses on the wire caused by vibrational, gravitational, electrical, and mechanical forces.

14 Claims, 5 Drawing Sheets

AEROGEL-SUPPORTED FILAMENT

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the containment of thin wire filaments in a supportive aerogel matrix to reduce tension and stresses on the filaments, particularly for use in radiation measurement instrumentation, vacuum gauges, and incandescent lamps.

Ionization counters measure ionizing radiation by detecting the amount of charge liberated by the interaction of ionizing radiation with suitable gases, liquids, or solids. A conventional proportional counter is composed of a thin, conducting wire filament (anode) under tension that is insulated from and surrounded by a coaxial, cylindrical conducting electrode (cathode). A gas, usually a mixture of a noble gas and a halogen or organic gas, serves as an ionizing medium and fills the space between the electrodes in a gas tight chamber. High voltage is applied to the electrodes, creating a large electric field near the anode.

Ionizing radiation, such as x-rays, $\beta$-rays, and $\gamma$-rays, enters the gas tight chamber and ionizes the atoms in the gas, and the electric field sweeps the liberated electrons and positive ions out of the gas. The electrons drift toward the anode wire, causing an electron avalanche at the anode and a small electrical current pulse. The output signal is typically amplified by a factor of $10^3$ to $10^8$ and is proportional to the number of electrons released by the ionizing radiation.

The principle of the ionization counter has been extended to drift chambers, commonly used in high energy physics experiments to track energetic electrons and nuclear particles. A drift chamber is a collection of individual ionization counters, often numbering in the tens of thousands, and arranged in planar or cylindrical arrays. The configuration of the drift chamber is such that the failure of a single anode wire can cause an electrical short across many other wires in the array, so that a significant segment of the drift chamber becomes inoperative.

The anode wires are often made of gold-plated tungsten and are typically 20–30 microns in diameter. The wires are stretched and placed under a load of about 80% of their breaking strength. The largest drift chambers use anode wires up to six meters in length. The physical demands placed on the wires invite breakage or separation of the bond connecting the wire to the rest of the circuitry. The stresses on the wires are compounded by the strong electric fields applied to them.

A design concept that helps to support and isolate the anode is described in U.S. Pat. No. 5,003,177 by Hornstra (Mar. 26, 1991). A helically-shaped insulator surrounds an inner electrode over the entire length of a coaxial cable. The insulator maintains a constant distance between the electrodes and contains a screening electrode that prevents leakage currents from flowing from the high voltage outer electrode to the inner signal electrode. The width of the insulator is minimized to fill as little space as possible between the electrodes because this proportion is lost as ionization space. The present invention provides an insulating, gas-permeable spacer and support structure for thin, tightly strung filaments in a variety of devices.

Ionization chambers, and other devices with numerous or precariously positioned wires under tension, would have increased lifetimes if the stresses on the wires could be decreased by embedding the wires in a supportive matrix. A supportive covering on the filaments would reduce the incidence of wire failure and, if there is wire breakage, would limit the subsequent damage done to the surrounding array by the broken wires. The challenge lies in finding a supporting material that exhibits a variety of physical properties; the material must be electrically nonconductive, thermally and mechanically stable, extremely gas-permeable, and transparent to ionizing radiation.

SUMMARY OF THE INVENTION

The present invention is the application of aerogels as a supportive material for thin wires in devices such as ionization counters and incandescent lamps. The invention is designed to circumvent the problem of wire breakage and device failure. The filaments are encased in a supportive structure of aerogel material while under minimum tension.

Aerogels are highly porous glasses of extremely low density ($<500$ mg/cm$^3$) that are typically made of silica (SiO$_2$), although they can be made from a wide variety of metal oxides. Aerogels possess the characteristics needed to support highly stressed wires, as in high temperature or high voltage environments. Aerogels are mechanically strong thermal and electrical insulators, and can be formed of low Z material to reduce interference with the ionizing radiation and liberated, charged particles. More important, open-cell aerogels can be made with highly interconnected pores, so that the aerogels are permeable to the ionizing gas in gas ionization detection devices.

The filaments are held under a predetermined tension in an aerogel solution made by a one-step or a two-step hydrolysis-condensation method. The aerogel solution gels and solidifies around the wire. Solvents in the gel are removed by supercritical extraction to form the final aerogel. The aerogel covering holds the filament or filaments in place and will reduce the damage done in a drift chamber if a wire detaches from the circuit board. An aerogel sheath will also reduce the deterioration of the filament in an incandescent lamp, caused by vibrations and erratic temperature cycles.

The aerogel ionization counter concept can be extended to many types of radiation detectors using the gas ionization and electron avalanche mechanism to measure ionizing radiation. The concept lends itself to applications where rugged, large arrays of wires are needed to adequately map the radiation fields produced, for example, in underground nuclear explosions, nuclear reactor environments, or space environments. Military applications also place heavy demands on equipment designed to monitor ionizing radiation.

More robust ionization counters could be used for explosives detection in the field. For example, the devices could measure gamma rays from the capture of neutrons in nitrogen compounds present in explosives. Further applications are possible in the detection of explosives concealed in luggage and freight in airport security systems, and mine field clearing. The high energy physics community regularly fields ionization counters in large arrays for the detection of new and exotic phenomena at accelerators, in space-born experiments on satellites, or on balloons. Also, medical physics applications in radiation monitoring present potential new uses for this invention.

DETAILED DESCRIPTION OF THE INVENTION

The present invention is a thin filament encased in aerogel material as a supportive matrix to reduce the stress on the filament created by large electric fields, high temperatures, gravitational forces, vibrations, or being under tension. These thin filaments are commonly made of metal wire. A filament is mounted in an aerogel solution, and the solution gels and solidifies around the filament.

Aerogels have an unusual combination of useful properties; they are electrically and thermally nonconductive, highly porous, gas-permeable, and mechanically strong. Aerogels are made from a wide variety of metal alkoxides; indeed, any metal that can form a metal alkoxide can be used to make aerogels. Typically, a silicon alkoxide starting reagent is used, such as tetramethoxysilane, tetraethoxysilane, tetrapropoxysilane, or tetrabutoxysilane. Aerogels can also be doped to impart or enhance certain properties in the materials.

Aerogels can be made of any density using a two-step hydrolysis-condensation method, and the density can be chosen to suit the requirements of a particular application. In addition, the porosity and permeability of the aerogels can be controlled by the method of aerogel formulation. Open-cell aerogels not only have high porosity, but the pores are interconnected and permit gas to permeate the material. Highly gas-permeable aerogels are used in applications such as an ionization counter, where the ionizing gas must diffuse through the aerogel and be uniformly distributed between the electrodes. Aerogels are also relatively transparent to ionizing radiation over short distances, which is an advantageous feature needed for applications in radiation detection devices.

Ionization Counters

Figure 1:
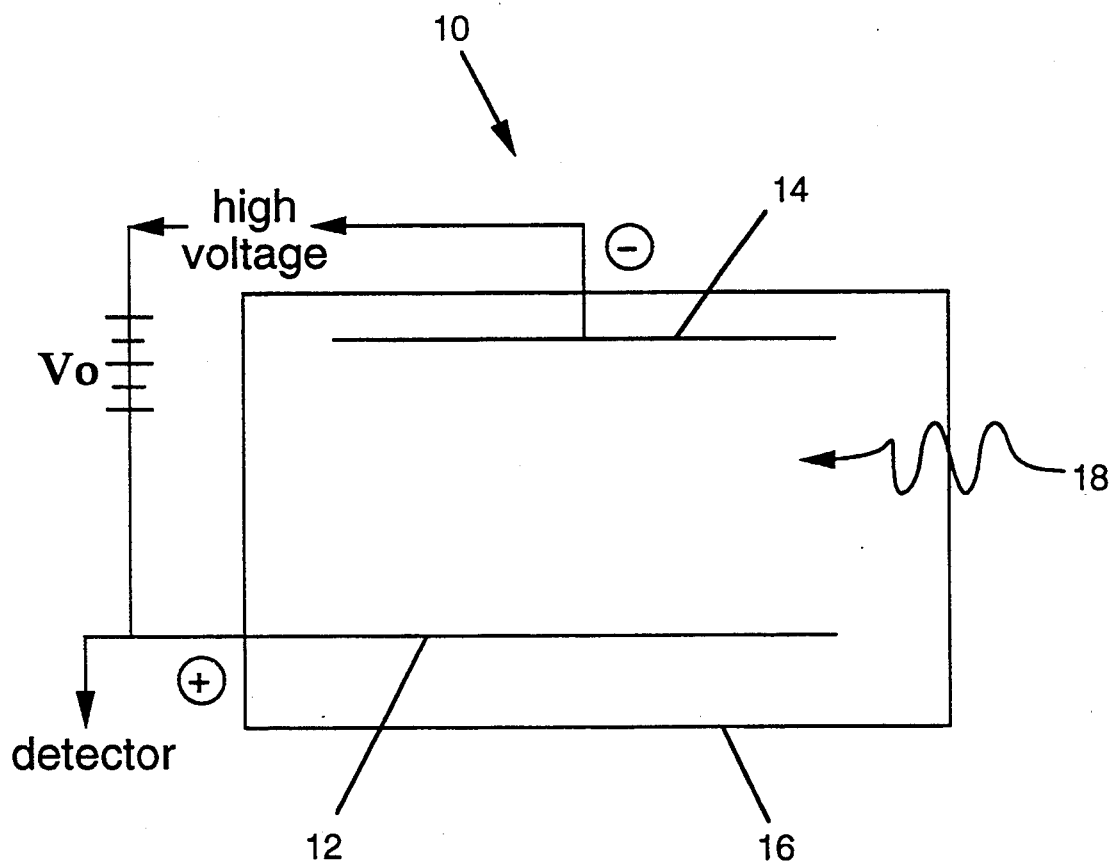
FIG. 1 is a schematic diagram of a conventional parallel plate ionization counter.

Filaments supported by an outer shell of aerogel material are especially suited for ionization and drift counters in which wire filaments are suspended in a gas tight chamber. FIG. 1 is a schematic diagram of a parallel plate ionization counter 10, showing the basic structural elements of a counter. An anode 12 and cathode 14 are placed in a gas tight chamber 16, which is filled with an ionizing medium. The ionizing medium is typically a gas, and may be an inert gas, such as argon, or an organic gas, like methane, isobutane, or ethylene. A high voltage power supply maintains an electric field between the anode 12 and cathode 14. Ionizing radiation 18 interacts with the gas, producing positive ions and electrons. Electrons are drawn to the anode 12 and measured.

Figure 2:
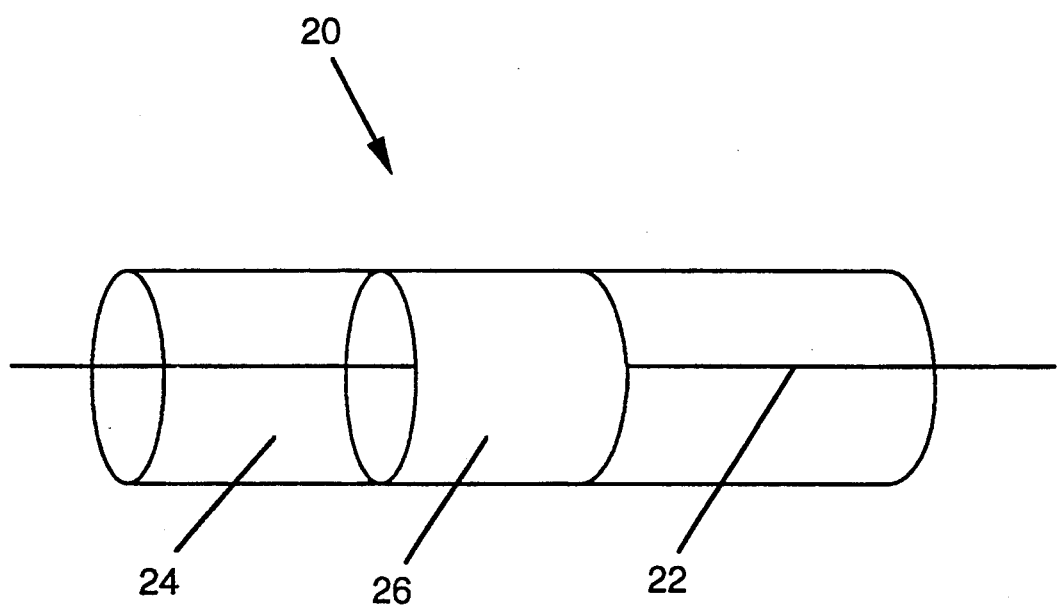
FIG. 2 shows a cylindrical aerogel ionization counter.

Because of the few basic requirements needed to make an ionization chamber, a wide variety of designs are possible to suit special applications. FIG. 2 shows a cylindrical aerogel ionization counter 20 according to the present invention. A fine wire filament 22 is cast under minimal tension in a matrix of low density aerogel 24. The cathode 26 consists of a sheet of metal foil wrapped around the aerogel cylinder 24.

The aerogel 24 used in the ionization counter 20 is a porous, open-cell, highly gas-permeable material through which the ionizing gas and ionized particles can diffuse. Although aerogels of many compositions may be used in particular applications for the ionization counter, the supportive matrix is typically formed of silica. The low density and the low atomic numbers of the constituents ($_{14}Si$, $_8O$) of a silica aerogel produce minimal interference with ionization and electron drift to the anode over short distances (i.e., less than a few centimeters).

The proper operation of the aerogel ionization counter 20 is dependent on the specific preparation process of the aerogel 24 matrix containing the thin anode wire 22. Gels containing the wire have been prepared by the hydrolysis and condensation of metal alkoxides using both one-step and two-step methods. Single step processing typically involves mixing a silicon alkoxide, such as tetramethoxysilane (TMOS) or tetraethoxysilane (TEOS), with a solvent, excess water, and a catalyst, typically $NH_4OH$.

In the two-step method, a partially hydrolyzed and condensed silica precursor is prepared by reacting a silicon alkoxide (e.g., TMOS) under acidic conditions with a substoichiometric amount of water and excess alcohol to keep the mixture in a single phase. This mixture is refluxed for a number of hours, and all alcohol, both solvent and reaction-generated, is removed by distillation. In the second step, the partially hydrolyzed, partially condensed silica intermediate is mixed with excess water, solvent, and a catalyst to form a gel solution. The molar ratio of water to TMOS is about 4:1. A detailed procedure of this two-step method for making metal oxide aerogels is presented in U.S. Pat. No. 5,275,796 by Tillotson et al. and the subsequent CIP application, Ser. No. 08/272,432, which is now allowed also by Tillotson et al.

In one embodiment of the cylindrical aerogel ionization counter in FIG. 2, the gel solution is poured into a polypropylene syringe with the wire filament threaded through the syringe's rubber plunger. The tip of the syringe has been cut off beforehand and is fitted with another rubber plunger through which the other end of the wire runs. The wire is pulled taut and fixed in place. Polymerization proceeds with a rise in solution viscosity until gelation occurs. The gel ages at room temperature for a minimum of one day and then is supercritically extracted to form an aerogel.

The extraction procedure involves placing the gel into a pressure vessel, where the solvent in the gel is exchanged with another fluid, typically liquid $CO_2$. The vessel is pressurized and heated above the critical point of the exchange fluid (31K, 1050 psi for $CO_2$). The supercritical fluid is vented, and the aerogel process is complete, with the wire set in the center of the aerogel cylinder.

Wire breakage, which has long been a problem in conventional ionization and drift counters, is eliminated because the wire is only required to remain straight during the curing process of the aerogel. Wires need only be tensioned to overcome gravitational sag over their length, or they can be suspended in the gel solution vertically with small weights to provide tension. Once the aerogel is cured to a solid phase, the wire is essentially captured and never comes into contact with adjacent wires. The wire is then protected from cracking or breaking caused by vibrations and flexing. Vibrations of the filament place stress on the ends of the wire where the wire is secured to circuitry.

A typical wire filament is about 25-50 μm in diameter. In a specific embodiment of this invention, the filament is a 50 μm gold-plated tungsten wire. A silica aerogel cylinder 24 forms an ionization counter for detecting gamma rays and is one centimeter in diameter, having a density of 150 mg/cm$^3$. The cathode 26 is a sheet of 75 μm thick gold foil. The counter assembly 20 is placed in a gas tight chamber (not shown) and pumped out under vacuum for 2-4 hours before backfilling with the ionizing medium, typically one atmosphere of a mixture of argon gas (90%) and methane gas (10%).

Figure 3:
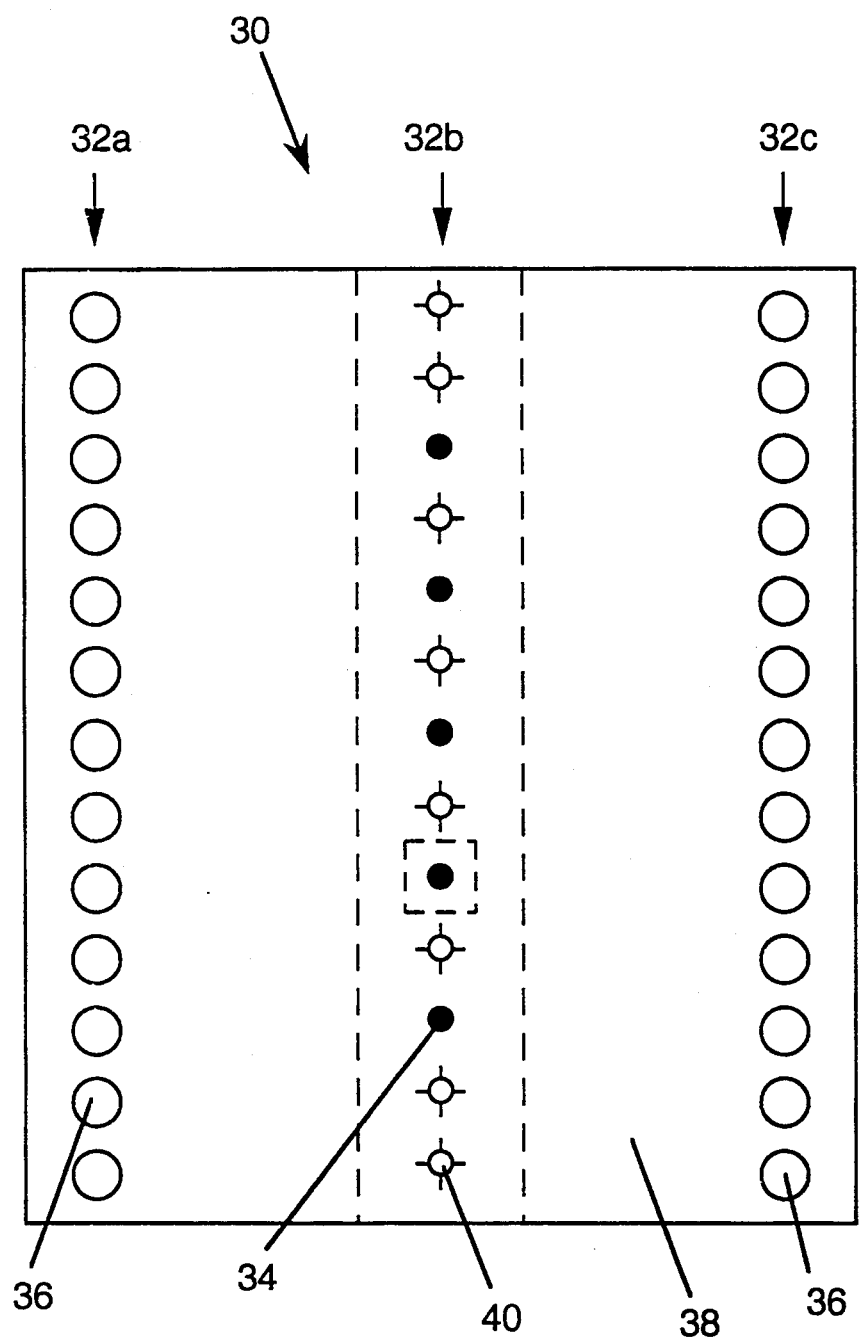
FIG. 3 is a cross-sectional view of a drift chamber with planar arrays of wire electrodes.
Figure 3A:
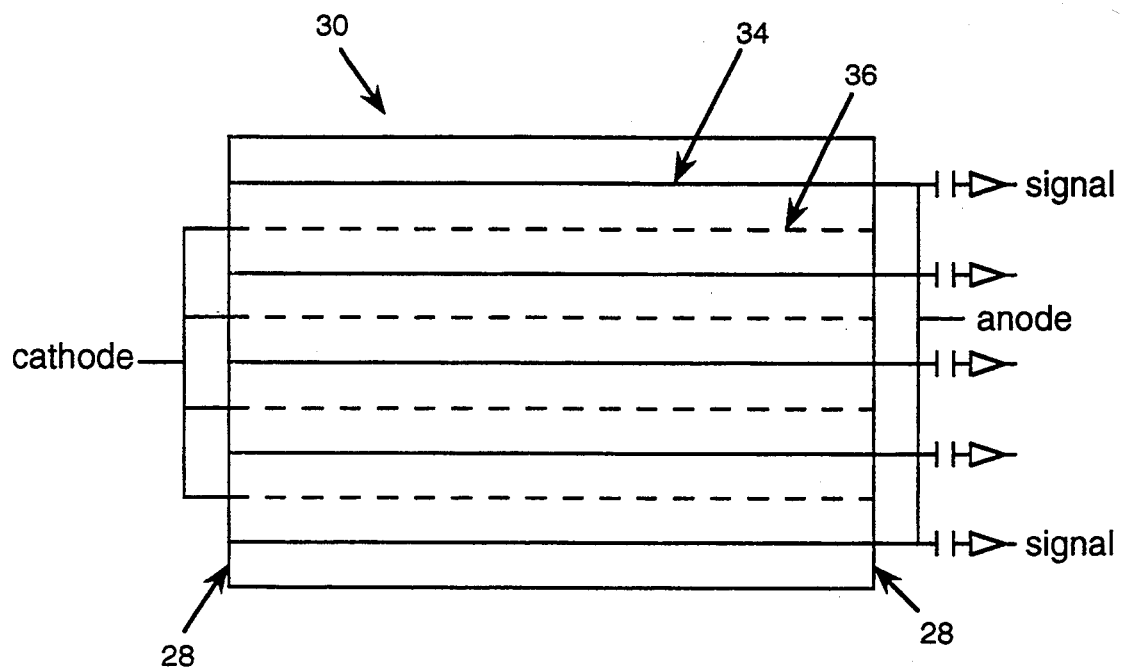
FIG. 3a shows a second cross-sectional view of the drift chamber FIG. 3.

FIG. 3 shows a cross-section of a drift chamber 30 having planar arrays 32a,32b,32c of anode wires 34, cathode wires 36, and field wires 40 that are perpendicular to the plane of the page of FIG. 3. The arrays 32 of wires 34, 36, and 40 can be encased collectively in a single block of aerogel 38 for support. Alternatively, the wires 34,36,40 can be individually embedded in aerogel cylinders and mounted in a frame, or the array of anode wires may be encased in a block of aerogel. These embodiments are shown in FIG. 3 by the dashed lines surrounding a single anode and the array of anodes. Field shaping wires 40 alternate with the anode wires 34. The cathode wires 36 and anode filaments 34 can be arranged into planar arrays as shown in FIG. 3, or in cylindrical arrays. In FIG. 3a, the wires 34,36 are parallel to the plane of the page and are connected to the sides 28 of the drift chamber 30.

The presence of the aerogel 38 around the anode wires 34 may adversely affect the integrity of the drifting electrons, so aerogel may not be a good candidate for large volume drift counters where the electrons drift over many centimeters. However, in applications using small diameter ionization counters or drift tubes, the aerogel counters offer an improved, "ruggedized" radiation detector.

Incandescent Lamps

Figure 4A:
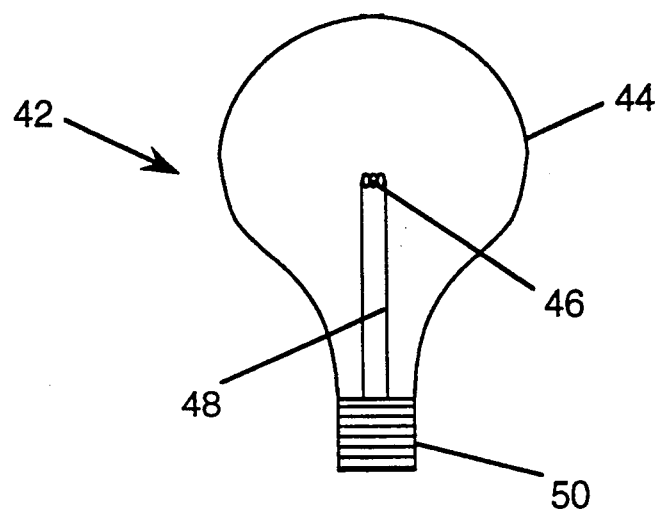
FIG. 4 shows an incandescent lamp and the aerogel-supported filament.
Figure 4B:
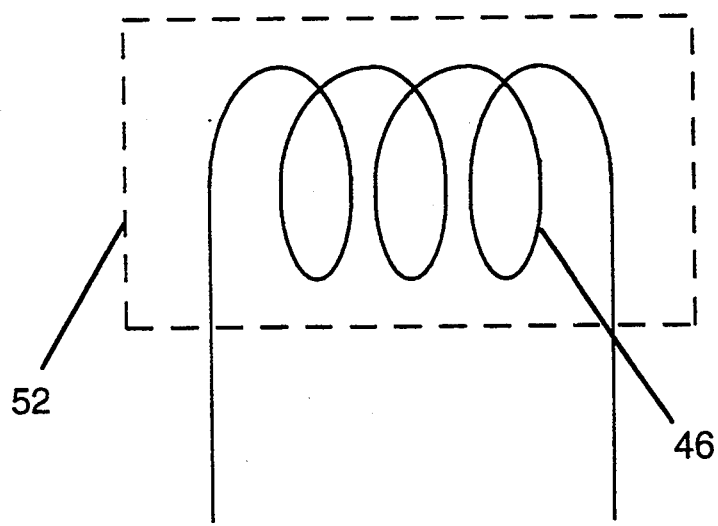

Aerogels may be used as a filament support in an incandescent lamp, which is shown generally in FIG. 4a. The lamp 42 is made of a bulb 44, a filament 46, a supporting structure 48 to hold the filament 46 in place in the bulb 44, and a base 50, which is connected to the bulb 44 and the support structure 48. FIG. 4b is a closer view of the lamp's filament 46. An aerogel matrix 52 surrounds the metal filament 46 and may fill the entire volume of the bulb 44. The supportive matrix 52 reduces the amount of vibration experienced by the filament 46 as electrical current passes through and heats the filament 46. The aerogel matrix 52 is shown by a dashed line to indicate that the matrix may encapsulate only the filament 46, or occupy the entire bulb 44.

Since aerogels are good thermal insulators, an aerogel lamp would release far less heat through the bulb and could be used in applications where a cool bulb is desirable, as in projection photography. The heat radiated from conventional lamps can cause nearby materials to become brittle or to evaporate. In an aerogel light bulb, however, the heat that does not radiate from the bulb would be released through the base of the lamp, and a modified design for the base would be required to accommodate the higher temperatures by diverting or capturing the excess heat.

Another potential application for aerogel lamps is in the area of optics calibration, where infra-red blocking filters are used to block the IR spectrum from a tungsten filament during spectral measurements. An aerogel material that blocks infra-red radiation could be used around the filament, eliminating the necessity for IR filters.

The foregoing description of preferred embodiments of the invention has been presented for purposes of illustration and description and is not intended to be exhaustive or to limit the invention to the precise form disclosed. Many modifications and variations are possible in light of the above teaching. The scope of the invention is defined by the following claims.

We claim:

1. An apparatus comprising:
   (a) a filament;
   (b) mounting means to which the filament is mounted under a predetermined tension; and
   (c) a low density aerogel matrix surrounding the filament for support.

2. An apparatus as recited in claim 1, wherein the diameter of the filament is less than about 100 microns.

3. An apparatus as recited in claim 1, further comprising:
   a cylindrical electrode connected to the mounting means,
   wherein the electrode is coaxially disposed around and spaced from the filament, and is electrically insulated from the filament.

4. An apparatus as recited in claim 3, further comprising:
   an ionizing medium within the cylindrical electrode.

5. An apparatus as recited in claim 3, further comprising:
   a gas tight chamber into which the cylindrical electrode and filament are placed.

6. An apparatus as recited in claim 3, wherein the electrode comprises a sheet of metal foil wrapped around the aerogel-encapsulated filament.

7. A drift chamber for detecting radiation, comprising:
   (a) a central array of anode wire filaments;
   (b) mounting means to which the filaments are mounted under a predetermined tension;
   (c) an outer array of cathode wires connected to the mounting means, wherein the cathode wires are electrically insulated from the anode wires;
   (d) a low density aerogel matrix disposed around the anode wires for support; and
   (e) a gas tight chamber in which the arrays of cathode wires and anode filaments are secured.

8. A drift chamber as recited in claim 7, wherein the aerogel matrix is a block of aerogel in which the arrays of anode and cathode wires are embedded.

9. A drift chamber as recited in claim 7, wherein each individual anode wire is encased in a cylinder or block of the aerogel matrix.

10. A drift chamber as recited in claim 7, further comprising:
    an ionizing medium, comprising argon gas and methane gas, within the gas tight chamber.

11. A drift chamber as recited in claim 7, further comprising:

a plurality of field shaping wires alternating with the anode filaments in the central array.

12. An incandescent lamp, comprising:
(a) a metal or metal alloy wire filament under a predetermined tension, through which an electric current can flow;
(b) a low density aerogel matrix encasing the filament for support;
(c) supporting means, which support the filament;
(d) a base connected to the supporting means; and
(e) a bulb connected to the base and enveloping the aerogel-encased filament.

13. An incandescent lamp as recited in claim 12, wherein the filament comprises tungsten or a tungsten alloy, and further comprising:

an inert gas within the bulb.

14. An incandescent lamp as recited in claim 12, wherein the aerogel matrix fills the bulb.

* * * * *